United States Patent
Qie et al.

(10) Patent No.: US 12,441,672 B2
(45) Date of Patent: Oct. 14, 2025

(54) COMPOSITE ADSORBENT FOR SEPARATION OF ETHYLBENZENE BY ADSORPTION DISTILLATION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Siyuan Qie, Beijing (CN); Wencheng Tang, Beijing (CN); Ming Zhao, Beijing (CN); Longsheng Tian, Beijing (CN); Siliang Gao, Beijing (CN); Weiwei Pang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 142 days.

(21) Appl. No.: 18/042,312

(22) PCT Filed: Aug. 24, 2021

(86) PCT No.: PCT/CN2021/114167
§ 371 (c)(1),
(2) Date: Feb. 21, 2023

(87) PCT Pub. No.: WO2022/042508
PCT Pub. Date: Mar. 3, 2022

(65) Prior Publication Data
US 2023/0322648 A1    Oct. 12, 2023

(30) Foreign Application Priority Data

Aug. 26, 2020    (CN) .................. 202010870602.8

(51) Int. Cl.
*C07C 7/13*    (2006.01)
*B01D 3/32*    (2006.01)
(Continued)

(52) U.S. Cl.
CPC .......... *C07C 7/13* (2013.01); *B01D 3/32* (2013.01); *B01D 3/34* (2013.01); *B01J 20/186* (2013.01);
(Continued)

(58) Field of Classification Search
CPC .................................. C07C 7/12–13
See application file for complete search history.

(56) References Cited

U.S. PATENT DOCUMENTS 3,917,734 A    11/1975   Derosset
3,997,619 A    12/1976   Neuzil
(Continued)

FOREIGN PATENT DOCUMENTS

CN    1064224 A    9/1992
CN    101255088 A    9/2008
(Continued)

OTHER PUBLICATIONS

Partial machine translation of p. 1093 of Modern Tower Technology, 2nd Edition, 20050131 Sinopec, CN—ISBN 978-7-80164-429-9 ; ISBN 7-80164-429-8. Retrieved Sep. 6, 2024 (Year: 2024).*
(Continued)

*Primary Examiner* — Matthew E. Hoban
(74) *Attorney, Agent, or Firm* — NKL Law; Allen Xue

(57) ABSTRACT

A composite adsorbent for separating ethylbenzene from C8 arene by an adsorption distillation contains 1-50 mass % of
(Continued)

a xylene adsorbent and 50-99 mass % of a carrier liquid. The carrier liquid is selected from one or two of alkane, aryl-substituted alkane, decalin and alkyl-substituted decalin. The alkane is C10-C26 alkane, and the aryl-substituted alkane is C13-C16 aryl-substituted alkane. The composite adsorbent can increase the volatility of ethylbenzene relative to other C8 arenes and thus can separate a high-purity ethylbenzene from C8 arene by the adsorption distillation.

12 Claims, 1 Drawing Sheet

(51) Int. Cl.
  *B01D 3/34* (2006.01)
  *B01J 20/18* (2006.01)
  *B01J 20/22* (2006.01)
  *B01J 20/28* (2006.01)

(52) U.S. Cl.
  CPC ......... *B01J 20/22* (2013.01); *B01J 20/28004* (2013.01)

(56) References Cited

U.S. PATENT DOCUMENTS

| | | |
|---|---|---|
| 4,001,111 A | 1/1977 | Geissler et al. |
| 4,079,094 A | 3/1978 | Rosback |
| 4,108,915 A | 8/1978 | Rosback et al. |
| 4,292,142 A | 9/1981 | Berg |
| 4,940,830 A | 7/1990 | Zinnen et al. |
| 5,135,620 A | 8/1992 | Brown |
| 5,453,560 A | 9/1995 | Kulprathipanja |
| 2015/0094508 A1 | 4/2015 | Corradi et al. |

FOREIGN PATENT DOCUMENTS

| | | |
|---|---|---|
| CN | 100577617 C | 1/2010 |
| DE | 2513953 C2 | 1/1986 |
| EP | 0372939 A1 | 6/1990 |
| GB | 1198592 A | 7/1970 |
| JP | S5497592 A | 8/1979 |
| JP | 2002308803 A | 10/2002 |
| JP | 2008174545 A | 7/2008 |
| JP | 2011525919 A | 9/2011 |
| RU | 2490245 C2 | 8/2013 |
| RU | 2521386 C1 | 6/2014 |
| RU | 2670963 C2 | 10/2018 |
| RU | 2497932 C2 | 11/2023 |
| WO | 2008033200 A1 | 3/2008 |

OTHER PUBLICATIONS

Krishnandi. Synthesis and Characterization of Crystalline NaY-Zeolite from Belitung Kaolin as Catalyst for n-Hexadecane Cracking. Crystals 2019, 9, 404 (Year: 2019).*

Williams. Inhibition of Xylene Isomerization in the Production of Renewable Aromatic Chemicals from Biomass-Derived Furans. ACS Catal. 2016, 6, 3, 2076-2088 (Year: 2016).*

Denayer. Adsorption of Normal and Branched Paraffins in Faujasite Zeolites NaY, HY, Pt/NaY and USY. Adsorption 3, 251-265 (1997) (Year: 1997).*

Partial machine translation of p. 1093 of Modern Tower Technology, 2nd Edition, 20050131 Sinopec, CN ISBN 978-7-80164429-9; ISBN 7-80164-429-8. Retrieved originally on Sep. 6, 2024 (Year: 2024).*

Chief Editor: Lanzhou Petroleum Machinery Institute; "Adsorptive Distillation"; Moder Tower Technology, 2nd Edition; Jan. 31, 2005; pp. 1091-1094.

Stankiewicz, Andrzej et al.; "Adsorptive Distillation"; Re-Engineering the Chemical Processing Plant-Process Intensification; Sep. 30, 2012; pp. 152-154.

Zhang, Guanghai; "Study on Separation by Adsorptive Distillation"; Tianjin University Master's Theses; Dec. 31, 1995; pp. 1-56.

* cited by examiner

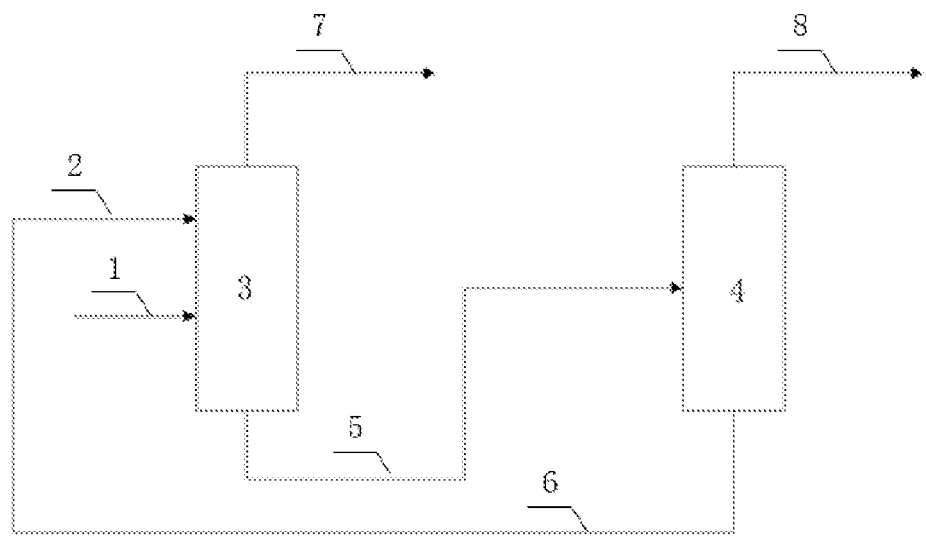

COMPOSITE ADSORBENT FOR SEPARATION OF ETHYLBENZENE BY ADSORPTION DISTILLATION AND APPLICATION THEREOF

TECHNICAL FIELD

The present invention relates to a composite adsorbent for separation by an adsorption distillation and the application thereof, concretely speaking, to a method for separating ethylbenzene in $C_8$ arene by an adsorption distillation using the composite adsorbent.

BACKGROUND TECHNOLOGY

Ethylbenzene is an important basic chemical material mainly used for the production of styrene. Currently, ethylbenzene is produced mainly by alkylation of benzene and ethylene. The oil refining and chemical industry has abundant ethylbenzene resources. Ethylbenzene accounts for about 18 mass % in the reforming $C_8$ fraction and about 50 mass % in the ethylene cracking $C_8$ fraction. If this part of ethylbenzene can be separated directly, it can save the consumption of ethylene and benzene and optimize the allocation of chemical resources; besides, after the separation of ethylbenzene in the $C_8$ fraction, the use of xylene without ethylbenzene or with significantly reduced ethylbenzene as the raw material of the arene complex plant will significantly improve the efficiency of the arene complex plant. Therefore, it is quite necessary to develop a new process for an efficient separation of ethylbenzene from the mixed $C_8$ arene.

At present, there are three methods to separate ethylbenzene from $C_8$ arene: the super distillation method, the adsorption method and the extraction method. It is a traditional process to separate ethylbenzene from the $C_8$ fraction using the super distillation method. Since the boiling points of the four isomers of the mixed $C_8$ arene are similar, and the boiling point difference between ethylbenzene and p-xylene is only 2.2° C., it is difficult to separate them by distillation.

GB1198592 describes a method for separating $C_8$ arene using a single or plural distillation columns, which requires at least 250 and preferably 365 column plates and a reflux ratio from 100 to 250:1. The method can separate ethylbenzene, ortho-xylene and a mixture of para- and meta-xylene by distillation. Para-xylene is further separated from the mixture of para- and meta-xylene by crystallization and other components are isomerized. This method has a high energy consumption and no economic advantage.

The separation of ethylbenzene by adsorption can be divided into two categories. One is to preferentially adsorb the non-ethylbenzene components in $C_8$ arene to obtain ethylbenzene product from the raffinate. For instance, U.S. Pat. Nos. 3,917,734, 4,079,094 and 4,108,915 respectively used Ca—X/Y, Sr—K—X or Sr—X zeolite to preferentially adsorb xylene isomers in $C_8$ arene and obtain ethylbenzene product from the raffinate, but it is difficult to obtain high-purity ethylbenzene product using such adsorbents, and its purity is easily affected by the composition of the raw material. The other is to preferentially adsorb ethylbenzene. CN100577617C discloses a method for separating ethylbenzene and para-xylene in the mixed $C_8$ arene using the pressure swing adsorption technology. A purging gas is used during the separation by the pressure swing adsorption to purge the adsorption bed layer, and the adsorbent as used is the ZSM-5 molecular sieve. Such an adsorbent can only take p-xylene and ethylbenzene together as aspirates, but cannot separate them. The selectivity of the adsorbent for the target products of p-xylene and ethylbenzene is low.

An extractive distillation process is a method that uses an extractant to increase the relative volatility of the components to be separated to improve the separation efficiency. At present, the solvent reported for the separation of ethylbenzene by the extractive distillation cannot provide an ideal selectivity, and the separation efficiency is low.

U.S. Pat. No. 4,292,142 discloses a method for separation of ethylbenzene from para- and meta-xylenes by an extractive distillation. Maleic anhydride and phthalic anhydride are used as composite solvents for the extractive distillation. To lower the freezing point of maleic anhydride and phthalic anhydride, an oxygen containing compound can be further added. The relative volatility of ethylbenzene and p-xylene can reach 1.22 under the condition that the solvent ratio is 1.5.

U.S. Pat. No. 5,135,620 discloses a process for separation of ethylbenzene from $C_8$ arene by an extractive distillation, A copper (I) salt of a hydrocarbonsulfonic acid is employed as an entrainer to separate ethylbenzene from $C_8$ arene by the extractive distillation. The sulfonic acid includes p-toluenesulfonic acid, p-dodecylbenzenesulfonic acid, p-hexadecylbenzenesulfonic acid, naphthalenesulfonic acid, phenolsulfonic acid, naphtholsulfonic acids or halogenbenzenesulfonic acid. The entrainer is firstly introduced into an extractive distillation column, a component rich in ethylbenzene is withdrawn from the top of the column, and the entrainer dissolved in xylene is withdrawn from the bottom of the column. The xylene and the entrainer can be separated through the distillation column. The xylene is withdrawn from the top of the column, and the entrainer dissolved in xylene is withdrawn from the bottom of the column and returned to the extractive distillation column. The relative volatility of ethylbenzene and p-xylene reaches 1.16 under the condition that the solvent ratio is 2.

CONTENTS OF THE INVENTION

It is an object of the present invention to provide a composite adsorbent for separating ethylbenzene from $C_8$ arene by an adsorption distillation and the application thereof. Said composite adsorbent can increase the volatility of ethylbenzene relative to other $C_8$ arenes and thus a high-purity ethylbenzene can be separated from $C_8$ arene by the adsorption distillation.

The composite adsorbent for separating ethylbenzene from $C_8$ arene by the adsorption distillation as provided in the present invention includes 1-50 mass % of a xylene adsorbent and 50-99 mass % of a carrier liquid, wherein the carrier liquid is selected from one or two of alkane, aryl-substituted alkane, decalin and alkyl-substituted decalin. The alkane is $C_{10}$-$C_{26}$ alkane, and the aryl-substituted alkane is $C_{13}$-$C_{16}$ aryl-substituted alkane.

The composite adsorbent provided in the present invention is obtained by mixing the xylene adsorbent with an appropriate amount of the carrier liquid. It can be used to separate ethylbenzene and xylene in $C_8$ arene by means of the adsorption distillation method, and obtain a high-purity ethylbenzene product. The method can reduce the fixed investment and the energy consumption for separating ethylbenzene.

DESCRIPTION OF THE DRAWINGS

The FIGURE is a flowchart of the method provided in the present invention for separating ethylbenzene from $C_8$ arene by the adsorption distillation.

MODE OF CARRYING OUT THE INVENTION

The composite adsorbent provided in the present invention comprises a xylene adsorbent and a carrier liquid. The said xylene adsorbent adsorbs xylene during the adsorption distillation, making it easy to separate ethylbenzene from xylene in $C_8$ arene. The said carrier liquid is used to carry the xylene adsorbent to flow. It does not react with $C_8$ arene, and its boiling point is preferably above 180° C. In this way, it is possible that the carrier liquid does not volatilize to the top of the adsorption distillation column during the adsorption distillation, and carries the adsorbent that adsorbs xylene into the distillation desorption column. The xylene in the adsorbent is desorbed in the distillation desorption column. The carrier liquid carries the regenerated xylene adsorbent and returns to the adsorption distillation column for reuse. The composite adsorbent can significantly increase the relative volatility of ethylbenzene relative to the respective isomers of xylene, and thus can separate a high-purity ethylbenzene from $C_8$ arene by the adsorption distillation.

The xylene adsorbent in the composite adsorbent of the present invention is used to increase the relative volatility of ethylbenzene relative to the respective isomers of xylene, and the carrier liquid is used to carry the xylene adsorbent to flow. The composite adsorbent preferably includes 5-35 mass % of the xylene adsorbent and 65-95 mass % of the carrier liquid.

The xylene adsorbent is preferably a Y molecular sieve with Group IA and/or Group IIA metal ions occupying cation sites, wherein the Group IA metal ions are preferably $Li^+$ or $Na^+$, the Group IIA metal ions are preferably $Sr^{2+}$ or $Ba^{2+}$, more preferably a NaY molecular sieve.

The grain size of the Y molecular sieve is preferably 0.1~2 microns, more preferably 0.2-1.5 microns.

The carrier liquid is selected from one or arbitrary two of alkane, aryl-substituted alkane, decalin and alkyl-substituted decalin, wherein the said alkane may be n-alkane or isoalkane, preferably $C_{10}$-$C_{24}$ n-alkane, more preferably $C_{11}$-$C_{20}$ n-alkane.

The said aryl-substituted alkane is preferably $C_{13}$-$C_{16}$ diphenyl alkane.

The alkyl of the said alkyl-substituted decalin may be $C_1$-$C_{12}$ alkyl, preferably $C_3$-$C_{10}$ alkyl, more preferably $C_2$-$C_6$ alkyl. The number of the substituting alkyl can be 1-4, preferably 1-2.

The method for separating ethylbenzene by the adsorption distillation provided in the present invention comprises introducing the $C_8$ arene mixture into the middle part of the adsorption distillation column and introducing the composite adsorbent of the present invention into the upper part of the adsorption distillation column. After the adsorption distillation, ethylbenzene is withdrawn from the top of the adsorption distillation column, and the composite adsorbent enriched with xylene is withdrawn from the bottom of the column and enters the middle part of the distillation desorption column. After the distillation desorption, a mixed xylene is withdrawn from the top of the column, and the regenerated composite adsorbent is obtained at the bottom of the column and is returned to the upper part of the adsorption distillation column for reuse.

In the above method, the overhead pressure of the adsorption distillation column is preferably 0.01-0.2 MPa. The theoretical plate number is preferably 30-100, more preferably 30-80. The composite adsorbent enters the column at a temperature of preferably 90-130° C., the column bottom temperature is preferably 140-250° C., and the overheard temperature is preferably 70-100° C.

The mass ratio of the composite adsorbent entering the adsorption distillation column to the $C_8$ arene mixture is preferably 5 to 30, more preferably 8 to 23; the mass ratio of the xylene adsorbent in the composite adsorbent to the $C_8$ arene mixture is preferably 1.5 to 6, more preferably 2 to 5; the mass ratio of the carrier liquid to the xylene adsorbent is preferably 1.5 to 20, more preferably 2 to 10. The reflux ratio at the upper part of the column is preferably 1 to 15, and more preferably 1 to 8.

The overhead pressure of the distillation desorption column is preferably 0.01-0.15 MPa, more preferably 0.01-0.06 MPa; the theoretical plate number is preferably 20-50, more preferably 25-45; the bottom temperature is preferably 160-280° C., and the overhead temperature is preferably 60-90° C. The reflux ratio at the upper part of the distillation desorption column is preferably 0.3-3, more preferably 0.5-2.

In the above method, the reflux ratio is the mass ratio of the materials returning to the upper part of the column to the materials discharged from the top of the column.

The said adsorption distillation column and the said distillation desorption column may be a packed column or a plate column.

In the method of the invention, the content of ethylbenzene in the $C_8$ arene mixture is preferably 10-85 mass %, more preferably 15-60 mass %.

In the adsorption distillation, the relative volatility is used to measure the separation effect of the solvents. The relative volatility (a) refers to the ratio of the volatility of the easily volatile component i to the volatility of the difficultly involatile component j in the solution to be separated, which can reflect the difficulty degree of separating the two components during the distillation process. The relative volatility of the two components i and j to be separated when reaching the gas-liquid equilibrium is calculated according to formula (1):

$$\alpha_{i/j} = \frac{y_i/x_i}{y_j/x_j} \tag{1}$$

In formula (1), x is the liquid phase mole fraction of the component under the equilibrium state, and y is the gas phase mole fraction of the component under the equilibrium state. When a is 1, the volatilities of the two components are equal, indicating that the two components cannot be separated by an adsorption distillation; when a is greater than 1, the higher the value of a is, the easier it is to separate the two components by the adsorption distillation.

The invention is further described below through the drawing.

In the FIGURE, a $C_8$ arene mixture from pipeline 1 is introduced into the middle part of the adsorption distillation column 3. The composite adsorbent is introduced from pipeline 2 into the upper part of the adsorption distillation column. The $C_8$ arene is in countercurrent contact with the composite adsorbent in the column for the adsorption and the distillation. The xylene in the $C_8$ arene is adsorbed by the xylene adsorbent. The ethylbenzene is distilled to the overhead and withdrawn from the overhead pipeline 7, and an ethylbenzene product is obtained after condensation. The composite adsorbent that adsorbed xylene is withdrawn from the bottom of the adsorption distillation column and enters the middle part of the distillation desorption column 4 through pipeline 5. The xylene is desorbed from the composite adsorbent through distillation to realize the desorption and the regeneration of the xylene adsorbent. The desorbed xylene is withdrawn from the overhead pipeline 8 of the distillation desorption column and condensed to obtain xylene. The regenerated composite adsorbent is withdrawn from the bottom of the distillation desorption column, and returned via pipeline 6 and pipeline 2 to the adsorption distillation column for reuse. The said xylene basically contains no ethylbenzene and can be used as an isomerization raw material to produce p-xylene.

The present invention is further illustrated by the following examples, but the present invention is not limited thereto.

In the examples and the comparative examples, the method for determining the relative volatility of the respective components of the $C_8$ arene is: adding the sample to be tested into the Agilent 7694 headspace sampler, letting it stand for certain time, determining the gas and liquid phase compositions in the sampler using Agilent 7890 chromatography when the gas-liquid equilibrium is reached, and calculating the relative volatility of the components according to Formula (1).

Example 1

Ethylbenzene, p-xylene, o-xylene, m-xylene were mixed according to the same mass ratio to formulate a $C_8$ arene mixture as the feedstock oil. The content of ethylbenzene in the feedstock oil is 25 mass %. A NaY molecular sieve powder with a grain size of 0.2-1 m was used as the xylene adsorbent, and n-tetradecane was used as the carrier liquid. The xylene adsorbent was mixed with the carrier liquid to produce a composite adsorbent having a xylene adsorbent content of 20 mass % and a carrier liquid content of 80 mass %.

The composite adsorbent and the feedstock oil were added to the headspace sampler, wherein the mass ratio of the carrier liquid/the xylene adsorbent/the feedstock oil was 8:2:1, and the mass ratio of the composite adsorbent to the feedstock oil was 10:1, and was let stand at 80° C. for 45 minutes to achieve the gas-liquid equilibrium. The gas and liquid phases were respectively taken for a composition analysis. The determined relative volatilities of ethylbenzene relative to the respective xylene isomers in the feedstock oil after addition of the composite adsorbent are shown in Table 1.

Example 2

The relative volatilities of ethylbenzene relative to the respective xylene isomers in the feedstock oil after addition of the composite adsorbent were determined according to the method of Example 1, except that the mass ratio of the carrier liquid/the xylene adsorbent/the feedstock oil as used was 8:3:1 and the mass ratio of the composite adsorbent to the feedstock oil was 11:1. The result is shown in Table 1.

Example 3

The relative volatilities of ethylbenzene relative to the respective xylene isomers in the feedstock oil after addition of the composite adsorbent were determined according to the method of Example 1, except that the mass ratio of the carrier liquid/the xylene adsorbent/the feedstock oil as used was 8:4:1 and the mass ratio of the composite adsorbent to feedstock oil was 12:1. The result is shown in Table 1.

Example 4

The relative volatilities of ethylbenzene relative to the respective xylene isomers in the feedstock oil after addition of the composite adsorbent were determined according to the method of Example 1, except that the mass ratio of the carrier liquid/the xylene adsorbent/the feedstock oil as used was 13:2:1 and the mass ratio of the composite adsorbent to the feedstock oil was 15:1. The result is shown in Table 1.

Example 5

The relative volatilities of ethylbenzene relative to the respective xylene isomers in the feedstock oil after addition of the composite adsorbent were determined according to the method of Example 1, except that the mass ratio of the carrier liquid/the xylene adsorbent/the feedstock oil as used was 18:2:1 and the mass ratio of the composite adsorbent to the feedstock oil was 20:1. The result is shown in Table 1.

Example 6

The relative volatilities of ethylbenzene relative to the respective xylene isomers in the feedstock oil after addition of the composite adsorbent were determined according to the method of Example 1, except that the used carrier liquid was n-undecane. The result is shown in Table 1.

Example 7

The relative volatilities of ethylbenzene relative to the respective xylene isomers in the feedstock oil after addition of the composite adsorbent were determined according to the method of Example 1, except that the used carrier liquid was n-hexadecane. The result is shown in Table 1.

Example 8

The relative volatilities of ethylbenzene relative to the respective xylene isomers in the feedstock oil after addition of the composite adsorbent were determined according to the method of Example 1, except that the used carrier liquid was diphenylmethane. The result is shown in Table 1.

Examples 9-10

The relative volatilities of ethylbenzene relative to the respective xylene isomers in the feedstock oil after addition of the composite adsorbent were determined according to the method of Example 1, except that the used carrier liquids were respectively butyldecalin and decalin. The result is shown in Table 1.

Example 11

The relative volatilities of ethylbenzene relative to the respective xylene isomers in the feedstock oil after addition of the composite adsorbent were determined according to the method of Example 1, except that the mass ratio of ethylbenzene/p-xylene/o-xylene/m-xylene in the used feedstock oil was 1:2:1:1 and the ethylbenzene content in the feedstock oil was 20 mass %. The result is shown in Table 1.

Example 12

The relative volatilities of ethylbenzene relative to the respective xylene isomers in the feedstock oil after addition of the composite adsorbent were determined according to the method of Example 1, except that the mass ratio of ethylbenzene/p-xylene/o-xylene/m-xylene in the used feedstock oil was 2:1:1:1 and the ethylbenzene content in the feedstock oil was 40 mass %. The result is shown in Table 1.

TABLE 1

| Example No. | ethylbenzene content in feedstock oil, mass % | carrier liquid | mass ratio of carrier liquid/xylene adsorbent/feedstock oil | relative volatility | | |
|---|---|---|---|---|---|---|
| | | | | $\alpha_{EB/PX}$ | $\alpha_{EB/OX}$ | $\alpha_{EB/MX}$ |
| 1 | 25 | n-tetradecane | 8:2:1 | 1.50 | 1.54 | 3.07 |
| 2 | 25 | n-tetradecane | 8:3:1 | 1.74 | 1.80 | 3.55 |
| 3 | 25 | n-tetradecane | 8:4:1 | 2.15 | 2.21 | 4.39 |
| 4 | 25 | n-tetradecane | 13:2:1 | 1.48 | 1.52 | 3.05 |
| 5 | 25 | n-tetradecane | 18:2:1 | 1.47 | 1.51 | 3.00 |
| 6 | 25 | n-undecane | 8:2:1 | 1.50 | 1.53 | 3.06 |
| 7 | 25 | n-hexadecane | 8:2:1 | 1.49 | 1.54 | 3.06 |
| 8 | 25 | diphenylmethane | 8:2:1 | 1.45 | 1.49 | 2.97 |
| 9 | 25 | butyldecalin | 8:2:1 | 1.47 | 1.51 | 3.01 |
| 10 | 25 | decalin | 8:2:1 | 1.47 | 1.50 | 2.99 |
| 11 | 20 | n-tetradecane | 8:2:1 | 1.34 | 1.38 | 2.84 |
| 12 | 40 | n-tetradecane | 8:2:1 | 1.57 | 1.68 | 3.35 |
| Comparative Example 1 | 25 | — | 0:0:1 | 1.06 | 1.22 | 1.08 |
| Comparative Example 2 | 20 | — | 0:0:1 | 1.06 | 1.23 | 1.08 |
| Comparative Example 3 | 40 | — | 0:0:1 | 1.07 | 1.24 | 1.09 |
| Comparative Example 4 | 25 | n-tetradecane | 8:0:1 | 1.08 | 1.24 | 1.09 |

Comparative Example 1

The relative volatilities of ethylbenzene relative to the respective xylene isomers in the feedstock oil were determined according to the method of Example 1, except that no composite adsorbent was used. The result is shown in Table 1.

Comparative Example 2

The relative volatilities of ethylbenzene relative to the respective xylene isomers in the feedstock oil were determined according to the method of Example 1, except that no composite adsorbent was used, and the mass ratio of ethylbenzene/p-xylene/o-xylene/m-xylene in the used feedstock oil was 1:2:1:1. The result is shown in Table 1.

Comparative Example 3

The relative volatilities of ethylbenzene relative to the respective xylene isomers in the feedstock oil were determined according to the method of Example 1, except that no composite adsorbent was used, and the mass ratio of ethylbenzene/p-xylene/o-xylene/m-xylene in the used feedstock oil was 2:1:1:1. The result is shown in Table 1.

Comparative Example 4

The relative volatilities of ethylbenzene relative to the respective xylene isomers in the feedstock oil were determined according to the method of Example 1, except that only n-tetradecane was added in the feedstock oil and the mass ratio of n-tetradecane to the feedstock oil was 8:1. The result is shown in Table 1.

As can be seen from Table 1, the use of the composite adsorbent in the present invention, compared with the method of using no composite adsorbent or only using a carrier liquid, can significantly increase the relative volatilities of ethylbenzene relative to the respective xylene isomers, indicating that the use of the composite adsorbent in the present invention can separate ethylbenzene from $C_8$ arene.

Example 13

Ethylbenzene and xylene in $C_8$ arene were separated according to the process shown in the FIGURE, using the composite adsorbent and the feed oil as in Example 1. The operating conditions of the adsorption distillation column and the distillation desorption column and the purity of the obtained product are shown in Table 2.

Comparative Example 5

A common distillation column was used to separate ethylbenzene and xylene in the feedstock oil of Example 1. The operating conditions of the distillation column and the purity of the obtained product are shown in Table 2.

Comparative Example 6

Ethylbenzene was separated from $C_8$ arene by the extractive distillation method. The $C_8$ arene was introduced into the middle part of the extractive distillation column, and the extraction solvent was introduced into the upper part of the column. After the extractive distillation, ethylbenzene was withdrawn from the overhead. The rich solvent rich in xylene was withdrawn from the bottom of the column, and entered the solvent recovery column. After distillation, the xylene was withdrawn from the overhead, and the lean solvent was withdrawn from the bottom of the column and returned to the extractive distillation column. 1,2,4-trichlorobenzene was used as the extraction solvent. The $C_8$ arene feedstock oil was formulated according to the method of Example 1. The operating conditions of the extractive distillation column and the solvent recovery column and the purity of the obtained product are shown in Table 2.

TABLE 2

| Items | | Example 13 | Comparative Example 5 | Comparative Example 6 |
|---|---|---|---|---|
| adsorption distillation column/ common distillation column/ extractive distillation column | theoretical plate number | 40 | 240 | 80 |
| | overhead pressure, MPa | 0.02 | 0.02 | 0.02 |
| | composite adsorbent/extraction solvent entry temperature, °C. | 120 | — | 120 |
| | overhead temperature, °C. | 85 | 85 | 85 |
| | column bottom temperature, °C. | 200 | 151 | 165 |
| | mass ratio of composite adsorbent/feedstock oil | 10 | — | 10* |
| | reflux ratio | 3 | 80 | 50 |
| distillation desorption column/solvent recovery column | theoretical plate number | 40 | — | 40 |
| | overhead pressure, MPa | 0.01 | — | 0.01 |
| | overhead temperature, °C. | 72 | — | 72 |
| | column bottom temperature, °C. | 242 | — | 172 |
| | reflux ratio | 1 | — | 3 |
| ethylbenzene product purity, mass % | | 99.8 | 99.8 | 99.8 |
| ethylbenzene product yield, mass % | | 99.5 | 99.5 | 99.5 |
| xylene product purity, mass % | | 99.8 | 99.8 | 99.8 |
| xylene product yield, mass % | | 99.5 | 99.5 | 99.5 |
| relative energy consumption | | 40 | 100 | 78 |

*mass ratio of extraction solvent/feedstock oil

Example 14

The composite adsorbent of Example 1 was used and the feedstock oil was a reformate $C_8$ fraction, wherein the mass ratio of ethylbenzene/p-xylene/m-xylene/o-xylene was 18:19:39:24. The ethylbenzene and the xylene in the $C_8$ fraction were separated according to the process shown in the FIGURE. The operating conditions of the adsorption distillation column and the distillation desorption column and the purity of the obtained product are shown in Table 3.

Comparative Example 7

The ethylbenzene and the xylene in the feedstock oil of Example 14 were separated using a common distillation column. The operating conditions of the distillation column and the purity of the obtained product are shown in Table 3.

TABLE 3

| Items | | Example 14 | Comparative Example 7 |
|---|---|---|---|
| adsorption distillation column/ common distillation column | theoretical plate number | 40 | 240 |
| | overhead pressure, MPa | 0.02 | 0.02 |
| | overhead temperature, °C. | 85 | 85 |
| | column bottom temperature, °C. | 200 | 153 |
| | composite adsorbent entry temperature, °C. | 120 | — |
| | mass ratio of composite adsorbent/feedstock oil | 10 | — |
| | reflux ratio | 3 | 100 |
| distillation desorption column | theoretical plate number | 40 | — |
| | overhead pressure, MPa | 0.01 | — |
| | overhead temperature, °C. | 72 | — |
| | column bottom temperature, °C. | 242 | — |
| | reflux ratio | 1 | — |
| ethylbenzene product purity, mass % | | 99.8 | 99.8 |
| ethylbenzene product yield, mass % | | 99.5 | 99.5 |
| xylene product purity, mass % | | 99.8 | 99.8 |
| xylene product yield, mass % | | 99.5 | 99.5 |
| relative energy consumption | | 42 | 100 |

Example 15

The composite adsorbent of Example 1 was used and the feedstock oil was an ethylene cracking gasoline $C_8$ fraction, wherein the mass ratio of ethylbenzene/p-xylene/m-xylene/o-xylene was 52:10:23:15. The ethylbenzene and xylene in the $C_8$ fraction were separated according to the process shown in the FIGURE. The operating conditions of the adsorption distillation column and the distillation desorption column and the purity of the obtained product are shown in Table 4.

Comparative Example 8

The ethylbenzene and the xylene in the feedstock oil of Example 15 were separated using a common distillation column. The operating conditions of the distillation column and the purity of the obtained product are shown in Table 4.

TABLE 4

| Items | | Example 15 | Comparative Example 8 |
|---|---|---|---|
| adsorption distillation column/ common column | theoretical plate number | 40 | 240 |
| | overhead pressure, MPa | 0.02 | 0.02 |
| | composite adsorbent entry temperature, °C. | 120 | — |
| | overhead temperature, °C. | 85 | 85 |
| | column bottom temperature, °C. | 210 | 153 |
| | mass ratio of composite adsorbent/feedstock oil | 10 | — |
| | reflux ratio | 2 | 35 |
| distillation desorption column | theoretical plate number | 40 | — |
| | overhead pressure, MPa | 0.01 | — |
| | overhead temperature, °C. | 72 | — |
| | column bottom temperature, °C. | 242 | — |
| | reflux ratio | 1.5 | — |
| ethylbenzene product purity, mass % | | 99.8 | 99.8 |
| ethylbenzene product yield, mass % | | 99.5 | 99.5 |
| xylene product purity, mass % | | 99.8 | 99.8 |
| xylene product yield, mass % | | 99.5 | 99.5 |
| relative energy consumption | | 44 | 100 |

As can be seen from Tables 2-4, separating ethylbenzene from the $C_8$ arene mixture by the adsorption distillation of the present invention, compared with the separation of ethylbenzene using a common distillation column or an extractive distillation alone, can significantly reduce the energy consumption and improve the separation efficiency of ethylbenzene and xylene.

The invention claimed is:

1. A composite adsorbent for separating ethylbenzene from $C_8$ arene by adsorption distillation, comprising 1-50 mass % of a xylene adsorbent and 50-99 mass % of a carrier liquid,
   wherein the carrier liquid is selected from alkane, aryl-substituted alkane, decalin, alkyl-substituted decalin, and a combination of two thereof, wherein the alkane is $C_{10}$-$C_{26}$ alkane, and the aryl-substituted alkane is $C_{13}$-$C_{16}$ aryl-substituted alkane,
   wherein the xylene adsorbent, prior to being mixed with the carrier liquid, is a Y molecular sieve powder having supported thereon ions of Group IA metals, Group IIA metals, or both,
   wherein the Y molecular sieve powder has a grain size of 0.1 to 2 microns, and
   wherein the xylene adsorbent flows with the carrier liquid during operation.

2. The composite adsorbent according to claim 1, wherein the composite adsorbent includes 5-35 mass % of the xylene adsorbent and 65-95 mass % of the carrier liquid.

3. The composite adsorbent according to claim 1, wherein the xylene adsorbent is a NaY molecular sieve.

4. The composite adsorbent according to claim 1, wherein the alkane is $C_{10}$-$C_{24}$ n-alkane; the aryl-substituted alkane is $C_{13}$-$C_{16}$ diphenyl alkane; the alkyl of the alkyl-substituted decalin is $C_1$-$C_{12}$ alkyl and the number of the substituting alkyl is 1-4.

5. The composite adsorbent according to claim 4, wherein the alkane is $C_{11}$-$C_{20}$ n-alkane; and the alkyl of the alkyl-substituted decalin is $C_3$-$C_{10}$ alkyl.

6. A method for separating ethylbenzene by adsorption distillation, comprising:
   introducing a $C_8$ arene mixture into a middle part of an adsorption distillation column;
   introducing the composite adsorbent of claim 1 into an upper part of the adsorption distillation column;
   after the adsorption distillation, withdrawing ethylbenzene from the top of the adsorption distillation column;
   withdrawing the composite adsorbent enriched with xylene from the bottom of the column and feeding it to a middle part of a distillation desorption column; and
   after a distillation desorption, withdrawing a mixed xylene from the top of the distillation desorption column, obtaining a regenerated composite adsorbent at the bottom of the distillation desorption column and feeding it to the upper part of the adsorption distillation column.

7. The method according to claim 6, wherein an overhead pressure of the adsorption distillation column is 0.01-0.2 MPa; a theoretical plate number is 30-100; the composite adsorbent enters the column at a temperature of 90-130° C.; and a column bottom temperature is 140-250° C.

8. The method according to claim 7, wherein a mass ratio of the xylene adsorbent in the composite adsorbent entering the adsorption distillation column to the $C_8$ arene mixture is 1.5 to 6; a mass ratio of the carrier liquid to the xylene adsorbent is 1.5 to 20; and a reflux ratio is 1 to 15.

9. The method according to claim 6, wherein an overhead pressure of the distillation desorption column is 0.01-0.15 MPa; a theoretical plate number is 20-50; and a bottom temperature is 160-280° C.

10. The method according to claim 9, wherein a reflux ratio of the distillation desorption column is 0.3-3.

11. The method according to claim 6, wherein the content of ethylbenzene in the $C_8$ arene mixture is 10-85 mass %.

12. The composite adsorbent according to claim 1, wherein the carrier liquid has a boiling point of higher than 180° C.

* * * * *